United States Patent
Villeneuve

(10) Patent No.: US 9,597,849 B2
(45) Date of Patent: Mar. 21, 2017

(54) MOLD FOR TIRE HAVING A REMOVABLE ANNULAR INSERT

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Bernard Villeneuve, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/910,564

(22) PCT Filed: Jun. 26, 2014

(86) PCT No.: PCT/IB2014/001205
§ 371 (c)(1),
(2) Date: Feb. 5, 2016

(87) PCT Pub. No.: WO2015/019134
PCT Pub. Date: Feb. 12, 2015

(65) Prior Publication Data
US 2016/0221285 A1 Aug. 4, 2016

(30) Foreign Application Priority Data

Aug. 5, 2013 (FR) ...................................... 13 01879

(51) Int. Cl.
*B29D 30/06* (2006.01)
*B29D 30/72* (2006.01)
*B29C 33/42* (2006.01)

(52) U.S. Cl.
CPC ......... *B29D 30/0606* (2013.01); *B29D 30/06* (2013.01); *B29D 30/0605* (2013.01);
(Continued)

(58) Field of Classification Search
CPC B29D 30/0606; B29D 30/0662; B29D 30/72; B29D 2030/0612; B29D 2030/0616; B29C 33/30; B29C 33/306; B29C 33/424
See application file for complete search history.

(56) References Cited

U.S. PATENT DOCUMENTS 1,567,402 A * 12/1925 Venn ..................... B29C 33/424
152/523
1,632,310 A * 6/1927 Paynter .............. B29D 30/0606
425/35
(Continued)

FOREIGN PATENT DOCUMENTS

DE 1729709 A1 3/1972
EP 1048489 A1 11/2000
(Continued)

*Primary Examiner* — James Mackey
(74) *Attorney, Agent, or Firm* — Dickinson Wright PLLC

(57) ABSTRACT

A mold for vulcanizing and molding a tire, the tire having a tread delimited by two sidewalls, at least one of which is provided with a complex protuberance, the mold having a ring for molding the tread of the tire and two shells for molding the sidewalls, the mold having an annular insert that separates the mold into at least two portions, namely a ring portion and a shell portion in the radially lower region of the sidewalls, the insert having two adjacent concentric elements that are intended to mold the complex protuberance, namely a radially outer element associated with the ring, and a radially inner element associated with the shell.

9 Claims, 4 Drawing Sheets

(52) U.S. Cl.
CPC ..... *B29D 30/0629* (2013.01); *B29D 30/0662* (2013.01); *B29D 30/72* (2013.01); *B29C 33/424* (2013.01); *B29D 2030/063* (2013.01); *B29D 2030/0612* (2013.01); *B29D 2030/0618* (2013.01)

(56) References Cited

U.S. PATENT DOCUMENTS

| | | | | |
|---|---|---|---|---|
| 1,969,083 A | * | 8/1934 | Lawson | B29D 23/24 425/28.1 |
| 2,296,016 A | * | 9/1942 | Bostwick | B29C 33/424 264/293 |
| 2,679,663 A | * | 6/1954 | Schwemler | B29D 30/0633 425/28.1 |
| 3,204,681 A | | 9/1965 | Olagnier | |
| 3,518,335 A | * | 6/1970 | Jablonski | B29D 30/0606 152/523 |
| 3,910,735 A | * | 10/1975 | Caretta | B29D 30/0629 425/40 |
| 4,547,139 A | * | 10/1985 | Hershberger | B29D 30/0606 425/192 R |
| 5,939,002 A | * | 8/1999 | Heindel | B29D 30/0606 249/56 |
| 6,315,539 B1 | * | 11/2001 | Yutronkie | B29D 30/0606 249/103 |
| 6,942,476 B2 | * | 9/2005 | Parmelee | B29C 33/32 249/103 |
| 7,883,326 B1 | * | 2/2011 | Parmelee | B29D 30/0606 249/103 |

FOREIGN PATENT DOCUMENTS

| | | |
|---|---|---|
| FR | 1268628 A | 7/1961 |
| GB | 1403030 A | 8/1975 |
| WO | 2013065552 A1 | 5/2013 |

\* cited by examiner

MOLD FOR TIRE HAVING A REMOVABLE ANNULAR INSERT

This application is a 371 national phase entry of PCT/IB2014/001205 filed 26 Jun. 2014, which claims the benefit of French Patent Application No. 13/01879, filed 05 Aug. 2013, the contents of which are incorporated herein by reference for all purposes.

BACKGROUND

The present disclosure relates to molds for tires. More specifically, it relates to the molding of complex protuberances on the sidewalls of these tires.

DESCRIPTION OF RELATED ART

Tires provided with lining elements placed on the sidewalls are known. For example, document FR1266628 discloses a tire for an aircraft that takes off at very high speed, said tire being designed to avoid splashes of water and having, on at least one sidewall, a profiled element modifying the usual section, that is to say having an approximately triangular section.

Document EP1048489 discloses a tire having beads, sidewalls and a crown having a reinforcement. in order to deflect the flow of water ejected laterally by this tire while running on ground covered with water, a protuberance bounded by an upper wall radially on the outside and a lower wall radially on the inside is disposed on at least one of the sidewalls. In that document, the example illustrated in FIG. 3 relates to a complex protuberance for which the molding/demolding operations are likely to cause a number of difficulties. Moreover, the presence of channels connected together so as to form an elbow in the plane of the figure to prevent the water from flowing easily inside said channel (the wall that delimits each channel forming a screen) contributes to making the molding/demolding operations more complex.

The production of these protuberances involves expensive embodiments of mold elements provided for molding and vulcanization. Moreover, if the dimensions and/or profile of a protuberance change, it may prove necessary to change the entire mold or at least one of the shells, at quite a considerable cost.

There is thus a need to provide a simple and practical solution that makes it possible to use molds that are highly suitable for tires provided with such protuberances.

SUMMARY

A first subject of an embodiment of the invention consists in providing a mold specifically designed for molding tires provided with at least one protuberance in the sidewall region.

Another subject of an embodiment of the invention consists in providing a mold for a tire provided with a sidewall portion with a protuberance of substantially complex shape, which is likely to make demolding operations tricky.

Another subject of an embodiment of the invention consists in providing a mold for a tire provided with a sidewall portion with a protuberance of given shape, which is likely to change or evolve.

Yet another subject of an embodiment of the invention consists in providing a mold for a tire with a protuberance, making the demolding operation as easy as possible.

Yet another subject of an embodiment of the invention consists in providing a mold for a tire with a protuberance, making the demolding operation risk-free in terms of damaging the protuberance.

To this end, an embodiment of the invention provides a mold for vulcanizing and molding a tire, this tire comprising a tread delimited by two sidewalls, at least one of which is provided with a complex protuberance, the mold comprising a ring intended for molding the tread of the tire and two shells for molding the sidewalls, the mold comprising an annular insert that separates the mold into at least two portions, namely a ring portion and a shell portion in the radially lower region of the sidewalls, said insert having two adjacent concentric elements that are intended to mold said complex protuberance, namely a radially outer element associated with the ring, and a radially inner element associated with the shell.

Such an architecture makes it easier to demold tires having a protruding element. Moreover, although the protruding element has a complex shape and/or is fragile and likely to be damaged during a demolding operation, the present architecture makes it possible to carry out these operations by eliminating or at the very least minimizing such risks.

In one advantageous embodiment, the insert comprises a groove concentric with the insert, the interface region between the two adjacent concentric elements passing through one of the edges of the groove.

The provision of an open region of the mold at the protuberance makes it possible to minimize, or avoid, the tensile and/or shear forces which would otherwise have been transmitted to the protuberance.

According to another advantageous embodiment, the groove is provided with a profile with a distal region followed by a narrower connection region between the protuberance and the sidewall of the tire.

By virtue of the above-described features of the mold, the mold according to an embodiment of the invention makes it possible to mold and vulcanize complex and/or fragile elements, for example a T-shaped protuberance connected to the sidewall by a narrower region than the rest of the protuberance.

Advantageously, the element 6 is movable radially outwards with the ring of the mold during demolding.

During demolding, by virtue of the movement of the ring in the radially outward direction, the element 6 is driven in the same direction, helping to entirely free a region of the protuberance. In the examples illustrated in the figures, the radially outer half is freed.

Likewise advantageously, the element 7 is movable axially outwards with a shell of the mold during demolding.

During demolding, by virtue of the movement of the shell in a direction different than that of the ring, the element 7 is driven in the same direction, helping to free the rest of the protuberance, in the examples illustrated in the figures, the radially inner half is freed.

According to one advantageous embodiment, the insert is formed from a plurality of insert parts that are positioned one after another so as to form an annulus.

Such a configuration makes it easier to manufacture the insert, and makes it possible to have a removable insert either in order to exchange a damaged part, to modify an element for marking the tire, or for any other reason. The invention thus proposes manufacturing an annular insert in a plurality of parts. This embodiment also makes it easier to produce the insert. Moreover, since each insert part has limited dimensions, fitting operations are easier. In addition, in the event that the profile and/or dimensions of a proturberance is/are modified over a limited angular portion of the sidewall of the tire, only the parts affected by these modifications the replaced. It is thus not necessary to replace all of the insert as in the related art.

In another embodiment, at least one insert part is produced by laser sintering. This insert part has all or part of the groove in the insert. The laser sintering method is a method which consists in constructing a part layer by layer by successively superposing layers of powder and selectively fusing this powder. This method may be computer-aided, making it possible to construct complex parts.

Laser sintering makes it possible to produce, with very great precision, mold shapes that are difficult to execute with conventional shaping techniques.

According to an advantageous variant, the groove is interrupted at regular intervals by projections that are distributed angularly around the circumference of the insert.

Such projections make it possible for example to produce recesses in the protuberance, as shown in the protuberance illustrated by way of example in FIG. 1B. The recesses make it easier for example for air to flow around the protuberance, and favors the aerodynamic performance.

The projections extend preferably radially inwards from the element 6 to windows having corresponding shapes and dimensions that are provided on the element 7 in line with the projections.

The insertion of the projections into the corresponding windows brings about a shearing effect of the rubber compound when the mold is closed, prior to vulcanization. Given the great precision required for the interlocking parts, the latter are advantageously produced by laser sintering.

By virtue of such an architecture, the mold according to the invention makes it possible to separate the elements for molding the protuberance on the sidewall from the other elements of the sidewall such as the overall profile of the sidewall, the marking, etc. Thus, in the event of a modification in the architecture or dimensions of the protuberance, it is possible to change only the insert, while retaining the other elements of the mold that are not affected by the changes. Flexibility in the preparation of molds with possibilities of evolutivity are obtained, at very advantageous costs. Only changing an insert can also make it possible to save time and increase productivity compared with replacing the entire mold.

In one particular embodiment, the groove in the insert is annular.

In another embodiment, the insert comprises a plurality of grooves.

In another embodiment, each insert part has contact surfaces that serve to interface with the adjacent insert parts. At least two insert parts are connected together in a region of their contact surface, this connection being able to be broken in order to separate the two insert parts.

By connecting all or some of the different insert parts together, it is possible to position all of the annular insert in the mold in one go.

During an operation of changing one of the insert pans, it is then sufficient to break the connections holding it to the other insert parts in order to extract it from the mold and replace it with another suitable insert part.

BRIEF DESCRIPTION OF THE DRAWINGS

Further features and advantages of embodiments of the invention will become apparent from the following description, given by way of nonlimiting example, with reference to the attached drawings, in which.

In the following description, elements which are substantially identical or similar will be denoted by identical references.

DETAILED DESCRIPTION OF SPECIFIC EMBODIMENTS

Definitions

A "tyre" means all types of resilient tread whether or not it is subjected to an internal pressure.

The "tread" of a tyre means a quantity of rubber compound delimited by lateral surfaces and by two main surfaces, one of which is intended to come into contact with a road surface when the tyre is running.

The "sidewall" of a tyre means a lateral surface of the tyre, said surface being disposed between the tread of the tyre and a bead of this tyre.

The "bead" of a tyre means a part of the tyre that is intended to be seated on a wheel rim.

A "mould" means a collection of separate moulding elements which, when brought closer together, delimit a toroidal moulding space 20 for vulcanizing and moulding a tyre.

The "equatorial plane" means a plane perpendicular to an axis of revolution of the mould, separating this mould into two identical half-moulds.

The "meridian plane" means a plane containing the axis of revolution of the mould.

A "complex protuberance" means a protuberance in at least two parts, with discontinuity between the parts.

Figure 1A:
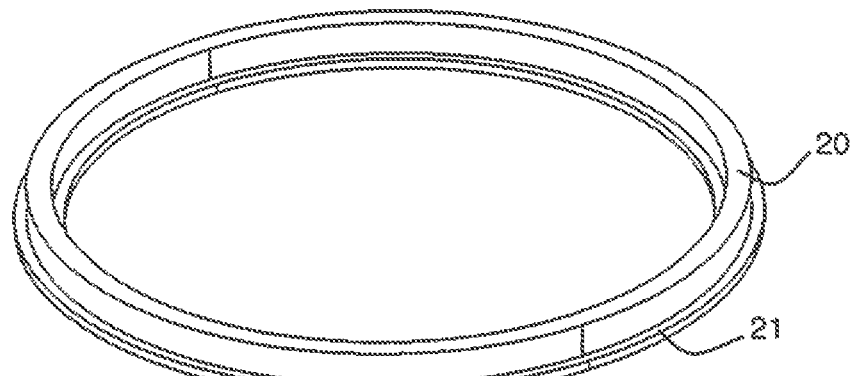
FIGS. 1A and 1B show examples of complex protuberances for tire sidewalls.
Figure 1B:
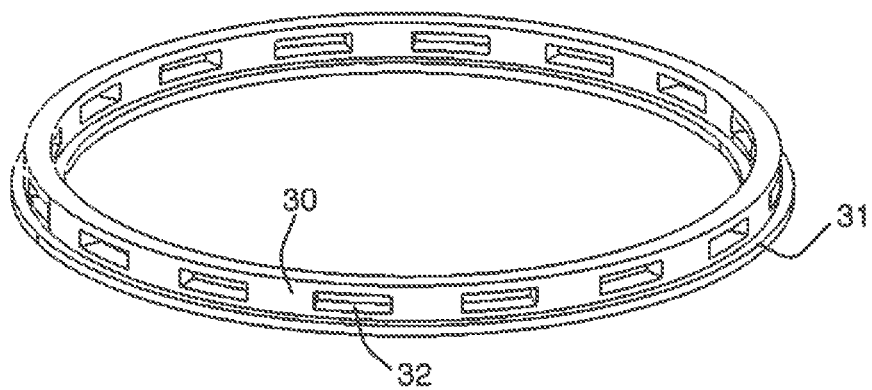

FIGS. 1A and 1B illustrate examples of complex protuberances for tires. The example in FIG. 1A consists of a protuberance with two substantially perpendicular profiled elements 20 and 21 that are connected together in a T-shape.

FIG. 1B shows a similar example of a protuberance, with two substantially perpendicular profiled elements 30 and 31 that are connected together in a T-shape. The profiled element 30 is provided with circumferentially distributed windows 32.

Figure 2:
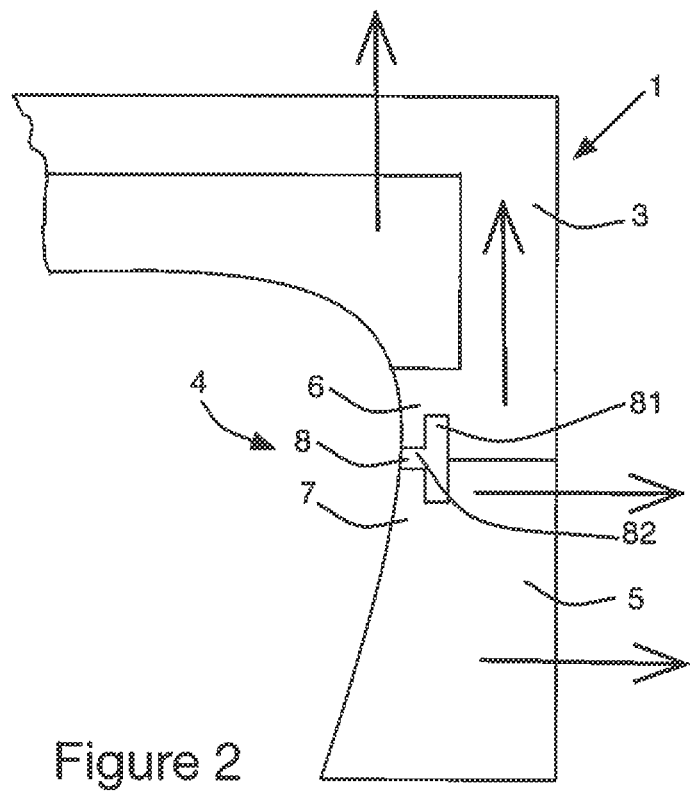
FIG. 2 schematically shows a view in cross section in a meridian plane of a first example of a part of a mold according to an embodiment of the invention.
Figure 3:
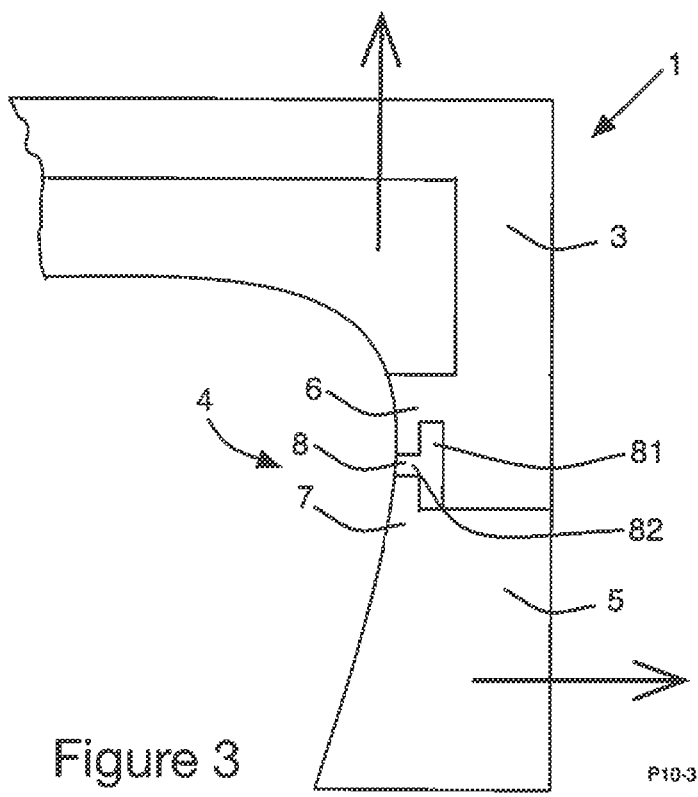
FIG. 3 schematically shows a view in cross section in a meridian plane of a second example of a part of a mold according to an embodiment of the invention.

As can be seen in FIGS. 2 and 3, the mold 1 according to an embodiment of the invention comprises a ring 3 intended for molding the tread of a tire and two shells 5 for molding the sidewalls. An insert 4 is mounted removably between the ring 3 and the shells 5. The insert 4 comprises two concentric elements 6 and 7 that are intended to mold a protuberance on the tire, namely a radially outer element 6 associated with the ring 3, and a radially inner element 7 associated with the shell 5. Each element is designed to be able to carry out the demolding process by moving the elements 6 and 7 as indicated by the arrows in FIGS. 2 and 3, that is to say radially outwards for the crown element 6 and axially outwards for the shell element 7.

A groove 8 is provided on the sidewall side of the insert. This groove opens up the volume required to form a complex protuberance on the sidewall of the tire produced by means of this mold. The profile and the dimensions of the groove are provided as a function of those of the protuberance on the tire to be molded. The complex-protuberance groove 8 comprises a distal region or sector 81, spaced apart from the sidewall, and a connection region or sector 82 for connecting to the sidewall of the tire. In this example, the two sectors are substantially perpendicular, with a T-shaped arrangement.

In these figures, both the profile and the position of the groove 8 can easily be seen. The groove 8 and the insert 4 are advantageously concentric.

Figure 4:
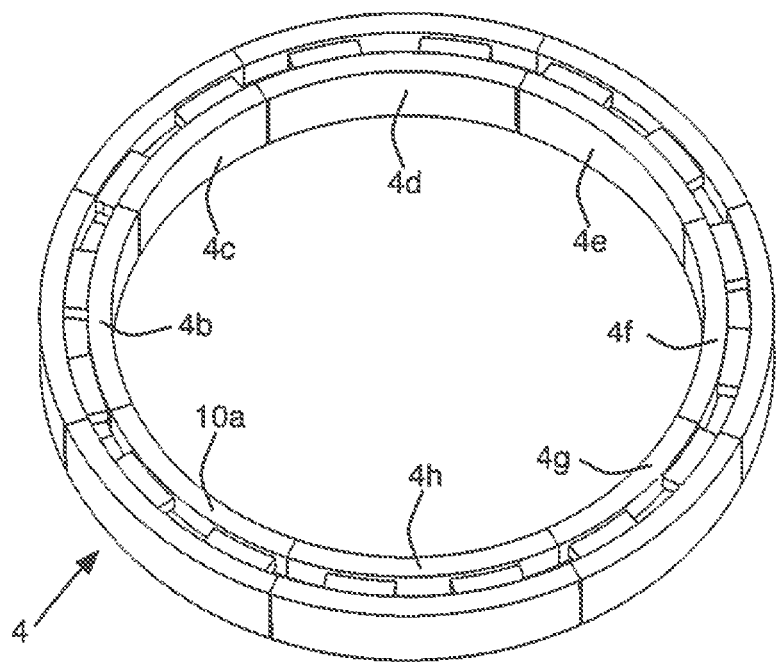
FIG. 4 schematically shows a perspective view of an example of an annular insert suitable for the mold in FIG. 2 and produced in a plurality of parts.

As shown in an exemplary embodiment in FIG. 4, the insert 4 is advantageously formed from a plurality of insert parts 4a to 4h that are aligned angularly one after another so as to form an annulus with suitable shapes and dimensions for positioning between the two mold portions separated thereby.

Figure 5:
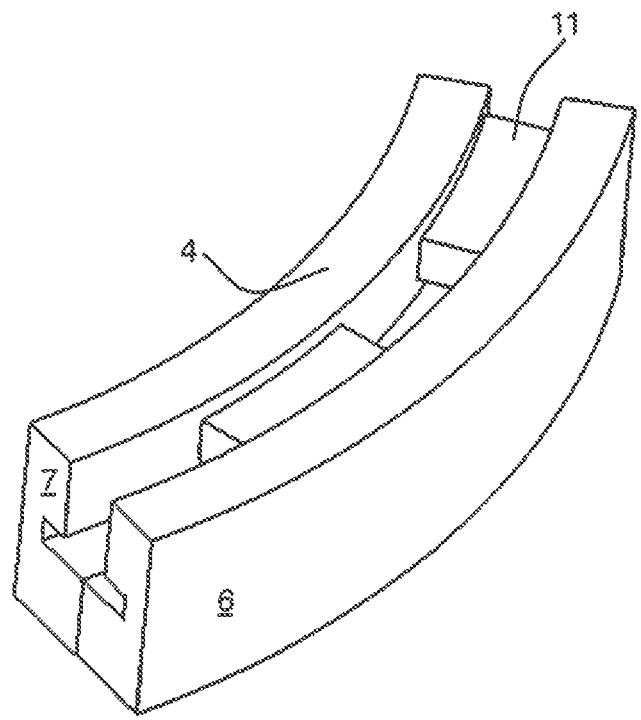
FIG. 5 schematically shows one of the pans of the insert in FIG. 4.
Figure 6:
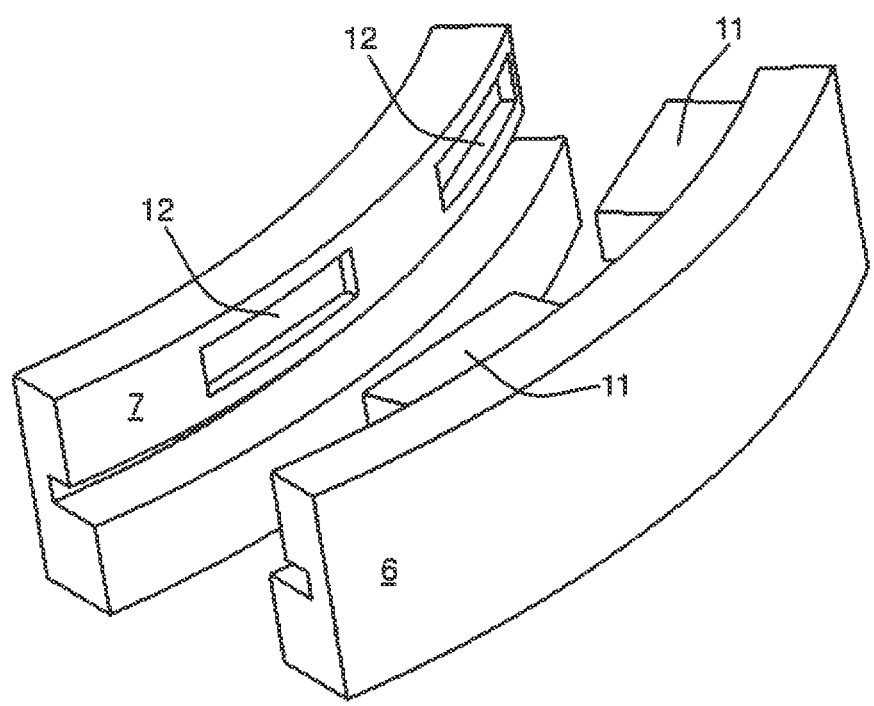
FIG. 6 schematically shows one of the parts of the insert in FIG. 4 with the two portions separated.

FIGS. 5 and 6 show the groove 8 interrupted at regular intervals by projections 11 that are distributed angularly around the circumference of the insert 4. These projections 11 extend radially inwards from the element 6 to windows 12 having corresponding shapes and dimensions that are provided on the element 7 in line with the projections 11.

In a variant embodiment that is not illustrated, the interface between the two insert sections produces a joining region With a contact surface. A bridge or joining element makes it possible to fix two adjacent parts of the insert together. The bridge is advantageously provided in the central region of the contact surface. In alternative embodiments, a plurality of bridges can be provided. The profile and the surface of the bridges can vary depending on the embodiment. The bridges are advantageously provided during the manufacture of the insert, in particular when the insert is produced by laser sintering. In order to change an insert part, the bridge(s) connecting the parts in question are broken or cut. Even though the parts are separable by breaking the bridges when the insert is removed from the mold, mounting in the mold, preferably with a tight fit, confers sufficient rigidity for the molding operations to be able to be carried out without risking breaking the bridges.

The figures and their descriptions given above illustrate embodiments of the invention rather than limit it. In particular, various embodiments have just been described in relation to a particular example in which the groove is T-shaped.

Nonetheless, it is clear to a person skilled in the art that embodiments of the invention may be extended to other alternatives in which grooves with different shapes, such as Y-shaped or Γ-shaped grooves, etc., are provided.

The verbs "comprise" and "have" do not exclude the presence of elements other than those listed in the claims.

The invention claimed is:

1. A mold for vulcanizing and molding a tire, the tire comprising
a tread delimited by two sidewalls, at least one of the sidewalls having a complex protuberance, the mold including
a ring for molding the tread of the tire and two shells for molding the sidewalls, the mold including an annular insert,
wherein the insert separates the mold into at least two portions, namely a ring portion and a shell portion in a radially lower region of the sidewalls,
the insert having two adjacent concentric elements for molding the complex protuberance, namely a radially outer element associated with the ring, and a radially inner element associated with the shell.

2. The mold according to claim 1, wherein the insert comprises a concentric groove, having an interface region between two adjacent concentric elements that passes through one of the edges of the groove.

3. The mold according to claim 2, wherein the groove includes a profile with a distal region followed by a narrower connection region between the protuberance and the sidewall of the tire.

4. The mold according to claim 1, wherein one of the two adjacent concentric elements is movable radially outwards with the ring of the mold during demolding.

5. The mold according to claim 1, wherein one of the two adjacent concentric elements is movable axially outwards with the shell of the mold during demolding.

6. The mold according to claim 2, wherein the insert is formed from a plurality of insert parts that are positioned one after another to form an annulus.

7. The mold according to claim 6, wherein at least one insert part is produced by laser sintering, the insert part having all or part of the groove in the insert.

8. The mold according to claim 2, wherein the groove is interrupted at regular intervals by projections that are distributed angularly around the circumference of the insert.

9. The mold according to claim 8, wherein the projections extend radially inwards from one of the two adjacent concentric elements to windows having corresponding shapes and dimensions that are provided on the element in line with the projections.

\* \* \* \* \*